United States Patent [19]

Lemke et al.

[11] 4,232,566
[45] Nov. 11, 1980

[54] SWITCHING LEVER MECHANISM

[75] Inventors: Otto Lemke, Recklinghausen; Manfred Krause, Herten-Langebochum, both of Fed. Rep. of Germany

[73] Assignee: Firma Carl Still, Fed. Rep. of Germany

[21] Appl. No.: 893,421

[22] Filed: Apr. 4, 1978

Related U.S. Application Data

[62] Division of Ser. No. 824,697, Aug. 15, 1977, Pat. No. 4,159,924.

[30] Foreign Application Priority Data

Aug. 19, 1976 [DE] Fed. Rep. of Germany ....... 2637314

[51] Int. Cl.$^3$ .................... F16H 53/06; F16H 21/44
[52] U.S. Cl. .......................................... 74/569; 74/97; 200/67 AA
[58] Field of Search ................. 74/569, 519, 522.5, 74/559, 97; 200/67 A, 67 AA

[56] References Cited

U.S. PATENT DOCUMENTS

| 1,753,020 | 4/1930 | Pielstick | 74/569 |
| 1,906,818 | 5/1933 | Seufert | 74/569 |
| 3,221,564 | 12/1965 | Raymond | 74/569 |

Primary Examiner—Kenneth Dorner
Attorney, Agent, or Firm—McGlew and Tuttle

[57] ABSTRACT

A switching lever mechanism for operating a switching lever between two end positions comprising first and second laterally spaced apart cams, a follower lever physically mounted between its ends and including one end with a roller follower disposed between the cams. An opposite end of the follower lever is connectible to a member for shifting the member. A socket is formed on the follower lever between the roller follower and the pivotal mounting thereof and a bolt having a spherical head is pivotally mounted on the socket. A bracket mounted in a stationary position alongside the follower lever is provided with a set screw having a head portion. A sleeve is pivotally mounted on the head portion and carries the bolt. A spring biases the sleeve and bolt outwardly to hold the follower lever in either of its two end positions.

1 Claim, 9 Drawing Figures

SWITCHING LEVER MECHANISM

This is a division of application Ser. No. 824,697 filed Aug. 15, 1977, now U.S. Pat. No. 4,159,924.

FIELD AND BACKGROUND OF THE INVENTION

This invention relates in general to coke ovens and, in particular, to a new and useful device for automatically and periodically switching the regenerative heating system of coke oven batteries from one group of heating flues to another, comprising a switchgear equipped with cam cylinders, cam levers, and valves, and using a pressurized or hydraulic fluid, such as oil, for driving working cylinders by which gas and air cocks, valves and other shutoff mechanisms are actuated, and which is also equipped with pressure fluid reservoirs and pressure pumps, and further relates to a device for converting the heating of the battery from one kind of gas to another.

DESCRIPTION OF THE PRIOR ART

A switching device for a regeneratively heated, vertical flued coke oven battery is known, from German Pat. No. 1,188,553, in which the cocks, valves, etc., of the individual heating walls are actuated, in a controlled manner, by hydraulically operated working cylinders, with one working cylinder being mounted at each oven side for each kind of cock, valve, etc., which are to be switched in groups by a common linkage or the like. A centrally controlled actuation by the operating fluid of the working cylinder is provided for opening the gas cocks of the one oven side, through a pressure reservoir.

A counterweight provides the return motion of the de-pressurized working cylinder and the closing of the gas cocks at the same side with the operating fluid flowing back to a reservoir. To open the waste-heat valves at one oven side and to close the air flaps at one oven side, a common working cylinder is provided, which is also centrally controlled and pressure-fluid operated. The depressurized return motion is assisted by a counterweight with the operating fluid flowing back into the reservoir and it is utilized for closing of the heat valves and opening of the air flaps. Further, electrical contact mechanisms are provided on the linkage of the working cylinders, which are connected to locking relays in the central control and serve the purpose of ensuring the correct order of switching.

Three-way cocks are provided in each of the pressure-fluid lines leading from the control device to the working cylinders of the gas cocks. The gas cocks are controlled by the pressure of the oven heating gas and are mounted in a manner such that, with a decrease of the gas pressure, the operating fluid conduits for the gas cocks held open, and extending between the control device and the working cylinders, are closed; and the conduits for the fluid flowing from the working cylinders to the outlet are opened, whereby the return motions for the cylinders are started.

Further, according to a particular design disclosed in German Pat. No. 1,236,465, at both the pusher side and the coke side, a pump for supplying the pressurized operating fluid to the various cylinders mounted on both sides, as well as a common oil reservoir for the two pumps are provided.

This equipment has proven satisfactory in service and it performs, for example, with a bisected heating of the batteries, the following operations:
  A. at the burn-up side;
    1. closes the heating gas cocks
    2. closes the air flaps
    3. opens the waste-heat valves
  Then, after scavenging with air for about 15 seconds,
  B. at the burn-off side;
    4. opens the air flaps
    5. closes the waste-heat valves
    6. opens the heating gas cocks.

In embodiments of the prior art, the switchgears are put into operation by means of two cam cylinders, whose cams control roller carrying cam levers which, in turn, are connected to valves for adjusting the operating position thereof. If, however, two cam cylinders are disposed side-by-side or one above the other, the device becomes difficult to survey and inaccessible for repairs, particularly on the two cam cylinders.

SUMMARY OF THE INVENTION

The present invention is directed to a control device for coke oven operation which is simple in design, more suitable for inspection, readily accessible for repairs and more resistant to wear. In accordance with the invention, instead of providing two cylinders as hithertofore, the control device is equipped with a single cam cylinder and the rollers of the cam levers do not move against the outer surfaces of the cams, as in the prior art, but engage the lateral surfaces thereof. By omitting the second cam cylinder, the inventive device becomes easy to survey and accessible for repairs. Repair work required, however, is reduced to a considerable extent.

In a particular embodiment of the invention, the automatic device for converting the operation from one kind of heating gas to another thus, for example, from lean gas to strong gas, or vice versa, is similarly designed, i.e., with only a single cam cylinder also. In this design, in accordance with the invention, the cam cylinder for converting the mode of operation from one heating gas to another is axially aligned and, by means of a coupling mechanism, is rendered engageable with the cam cylinder for periodical switching, and is mounted for movement by the drive of the cam cylinder. To this end, the cam cylinder to be coupled is moved in the direction of its longitudinal axis. If, in such an arrangement, the cam levers were to follow the front faces of the cams, the cams had to be beveled and the rollers of the cam levers shaped conically, in order to obtain a switching motion of the cam levers upon a longitudinal displacement of the cam cylinder. A sliding engagement of such conical rollers with beveled cams causes considerable wear of the rollers. On the contrary, by providing a lateral engagement of the cam lever rollers on the lateral cam surfaces, even with a longitudinal displacement of the cam cylinder, no particular design of the cams and rollers, for example, beveling and conical shape, is necessary, and neither cams nor rollers are exposed to any significant wear.

During conversion of the heating from strong gas to lean gas and vice versa, the following operations are performed:
  1. Closing of the inlet cocks for the non-selected kind of gas on each heating wall;
  2. opening of the inlet cocks for the selected kind of gas on each heating wall;

3. To heat with lean gas, closing of the air flaps of the regenerator-chamber waste gas valves, which are used in such operation for preheating the gas;
To heat with strong gas, they must be actuated in a predetermined rhythm;
4. While converting from strong gas to lean gas, enlarging of the air inlets in the conversion valves of the regenerator chambers, through which air is admitted both during strong gas and lean gas heating, to an approximately double area, and inversely, for well-known reasons;
5. For heating with lean gas, where the waste gas valves of the regenerator chambers serve for gas preheating, closing and opening of these valves in the same direction as the lean gas switching coks. For strong gas heating, however, they must be switched in the same direction as the waste gas valves; and
6. Adjustment of the stack draft, which differs depending on the type of gas used.

A device which automatically performs these operations is disclosed, for example, in German Pat. No. 1,961,579. By uniting such a device with the device for periodically switching the heating, in accordance with the invention, an important simplification of the entire heating mechanism of coke-oven batteries is obtained.

In accordance with a further development of the invention, for simplifying the construction and improving its inspection, all valves, i.e., both those for switching the heating and those for converting the mode of gas operation, are united to well-known valve blocks, and for reasons of manufacture and assembly, three blocks are provided. Accordingly, an object of the invention is to provide a combined control device for the operation of coke-oven batteries which includes both a control part for converting from heating from a strong gas to a lean gas, and inversely, and a control part for switching the regenerative heating system from one group of heating flues to another.

Another object of the invention is to provide a combined control device for operation of coke-oven batteries, both for switching purposes and for converting from one heating gas to another, which includes a rotary switching control cylinder which is rotatably mounted on a support frame alongside of a rotary conversion control cylinder in a manner such that they may be rotated together or only one may be rotated, and which includes a plurality of axially spaced, circumferentially arranged cams on each cylinder providing controls for the operation of switching valves which are arranged alongside each cylinder and which operate the respective converting valve elements and switching valve elements associated with the respective cylinders.

A further object of the invention is to provide an improved cam construction for operating control valves of a switching or converting operation of a coke oven.

Another object of the invention is to provide a control device and valve construction which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a combined device for switching and converting.

DESCRIPTION OF THE PREFERRED EMBODIMENT

Figure 1:
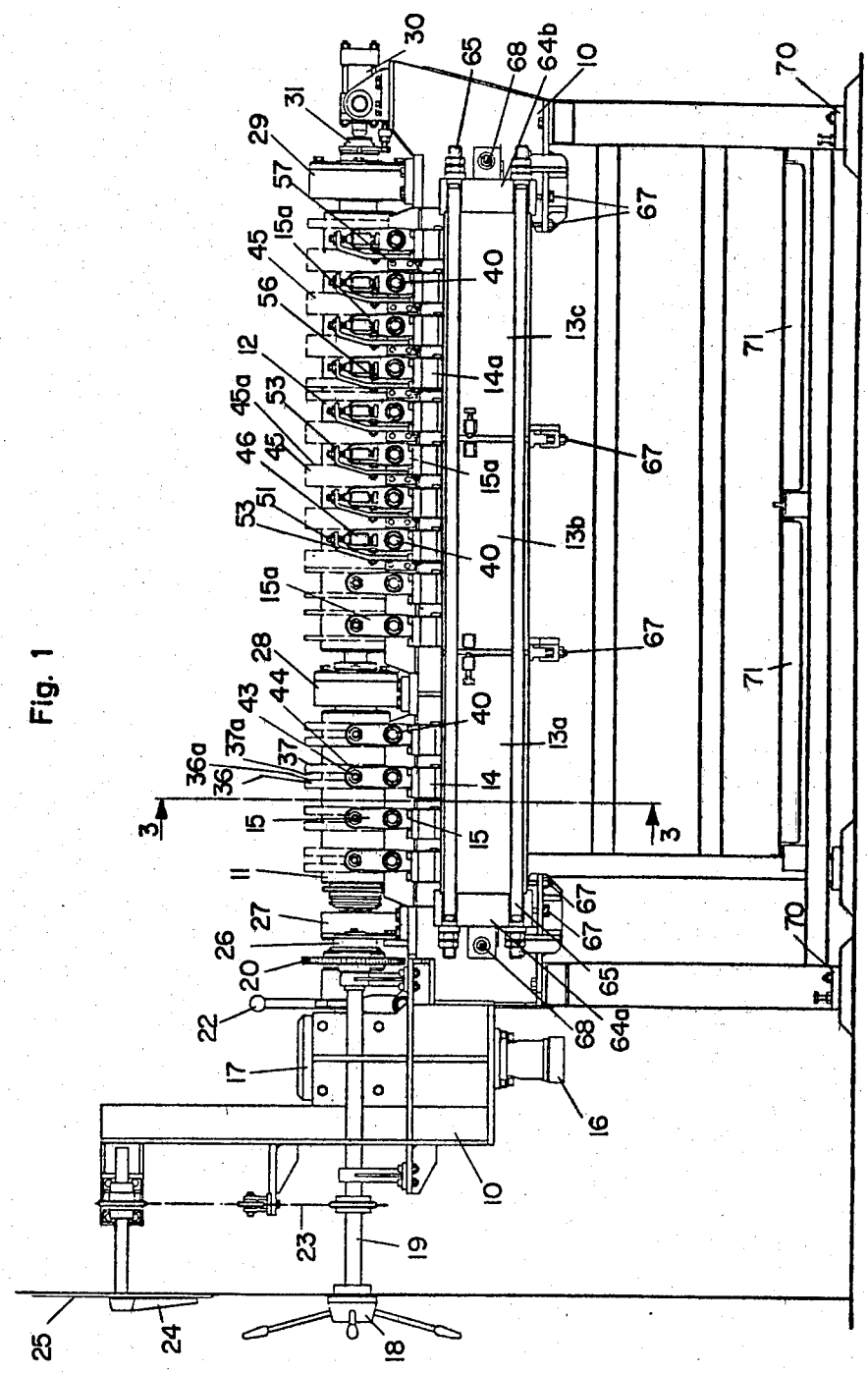
FIG. 1 is a side elevational view of a switching control device for the operation of a coke oven, constructed in accordance with the invention.
Figure 2:
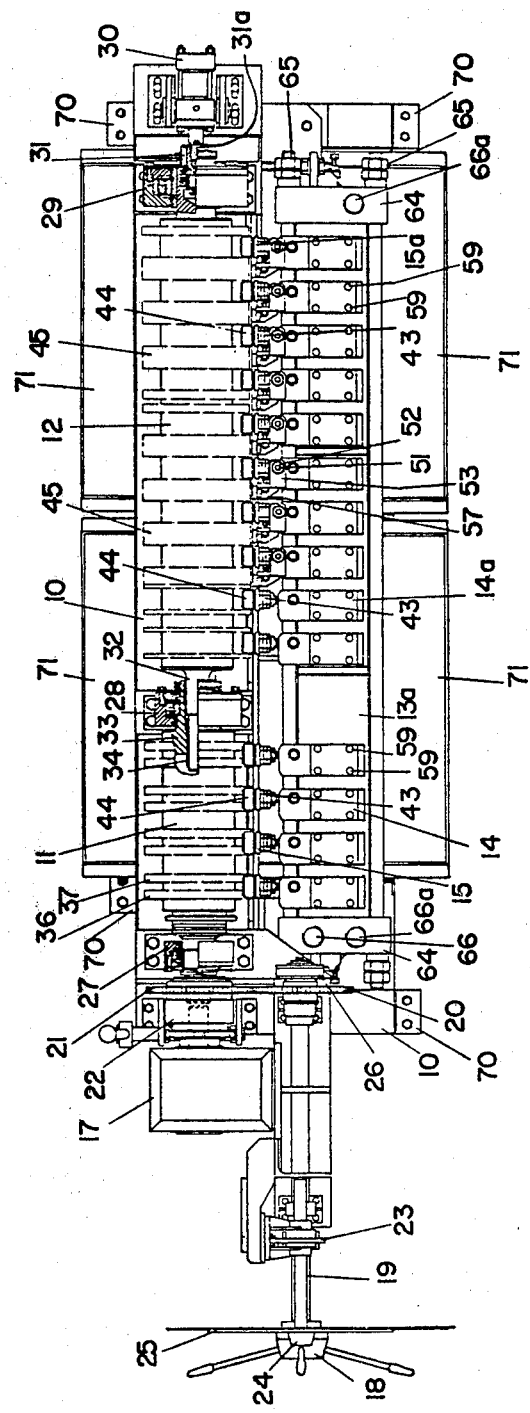
FIG. 2 is a top plan view of the device.

Referring to the drawings in particular, the invention embodied therein, comprises a combined control device for the operation of a coke oven battery which is shown in FIGS. 1 and 2, and which includes a control part in the form of a cylinder 11, which is mounted for rotation about a horizontal axis and is employed for the control of the switching of the regenerative heating system from one group of heating flues to another and which is arranged alongside of another control part or cylinder 12 which is provided for control of the conversion from a heating from a strong gas to a lean gas, or vice versa.

In accordance with the invention, the control is effected by the selected rotation of the switching cylinder 11 alone or by the combined rotation of the switching cylinder 12 which may be engaged with cylinder 11 and the operation is effected by actuating one or more control valves 14 for switching which are arranged in spaced axial location alongside the associated switching cylinder or by actuating one or more of the control valves 14a for effecting the conversion which are arranged in spaced axial location along the conversion cylinder 12.

The device includes a base frame 10 on which the rotary control cylinder 11 and the rotary control cylinder 12 are arranged alongside of three valve blocks 13a, 13b, 13c, control valves 14 and 14a, and control levers 15 and 15a.

The two rotary cylinders 11 and 12 are equipped with a drive comprising a hydraulic motor 16 and a gear transmission 17 by which the speed of the motor is reduced to the desired cylinder speed. In case of failure of drives 16 and 17 or of other troubles, cylinders 11 and 12 may also be rotated manually. For this purpose, a handwheel 18 is provided. Handwheel 18 is keyed on a shaft 19 which is supported at two points. A gear 20 is secured to the opposite end of shaft 19, which meshes with a gear 21 mounted on control cylinder 11. It is advisable to disengage a multiple disc clutch 22 which is provided between control cylinder 11 and worm gear 17 prior to rotating the cylinders manually, in order to negate the braking effect of drive motor 16 and gear 17. The instantaneous position of cylinders 11 and 12 is transmitted, through a chain drive 23, to a pointer 24 and can be read on a dial 25. A return stop 26 allows rotation in only one direction.

Control cylinder 11 and conversion cylinder 12 are received in pillow-block bearings 27, 28 and 29 (FIG. 2). Conversion cylinder 12 is mounted so as to be displaceable in the direction of its longitudinal axis by a definite stroke, for performing an additional switching motion. The movement of the stroke is effected by a cylinder 30 which is connected to the conversion cylinder 12 through a special bearing construction 31. This bearing construction prevents a piston rod 31a of cylinder 30 from rotating along with cylinder 12. Cylinder 30 is operated by a pressurized fluid which is supplied through a valve (not shown) which is completely independent of the rest of the device.

The displacement of conversion cylinder 12 in the direction of its longitudinal axis requires, in addition, a particular common bearing arrangement with control cylinder 11. This arrangement comprises a pin 32 (FIG. 2) carried by conversion cylinder 12, which is introduced in a bore 33 of control cylinder 11, whereupon the rotary motion of control cylinder 11 is transmitted, through sliding feather keys or splines 34, to conversion cylinder 12. Consequently, control cylinder 11 and conversion cylinder 12 always rotate in the same direction, which complies with the intended function of the device.

Figure 4:
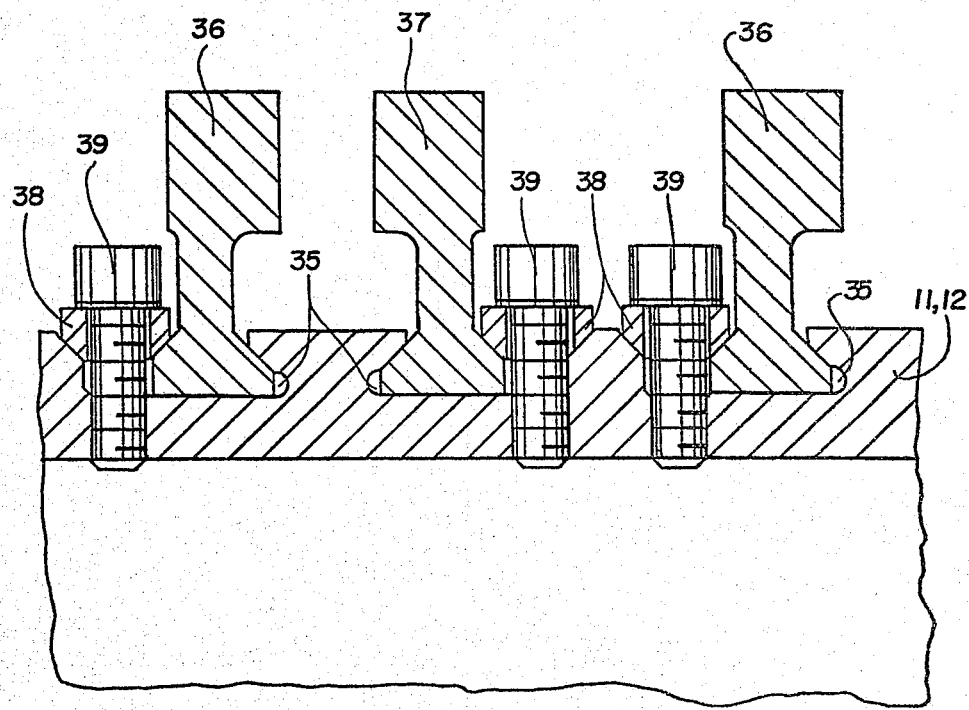
FIG. 4 is an enlarged partial sectional view of a rotary control cylinder or conversion cylinder indicating the connection of the control cams thereto.
Figure 9:
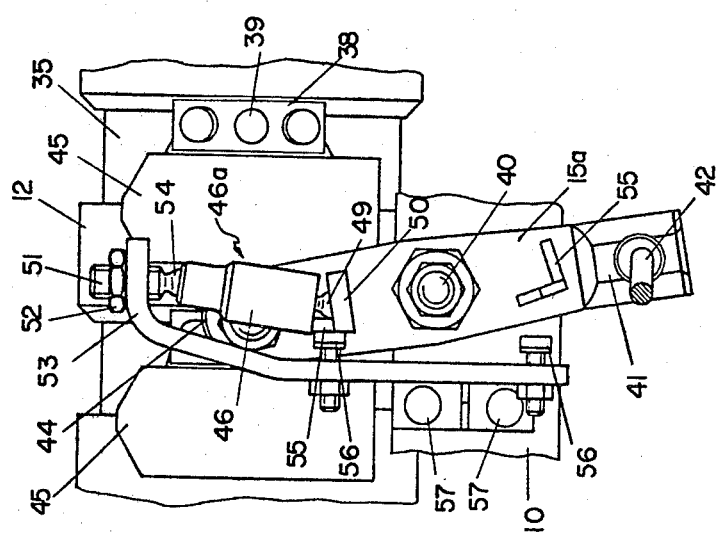
FIG. 9 is a view similar to FIG. 8 showing an opposite end position of the conversion control lever.
Figure 8:
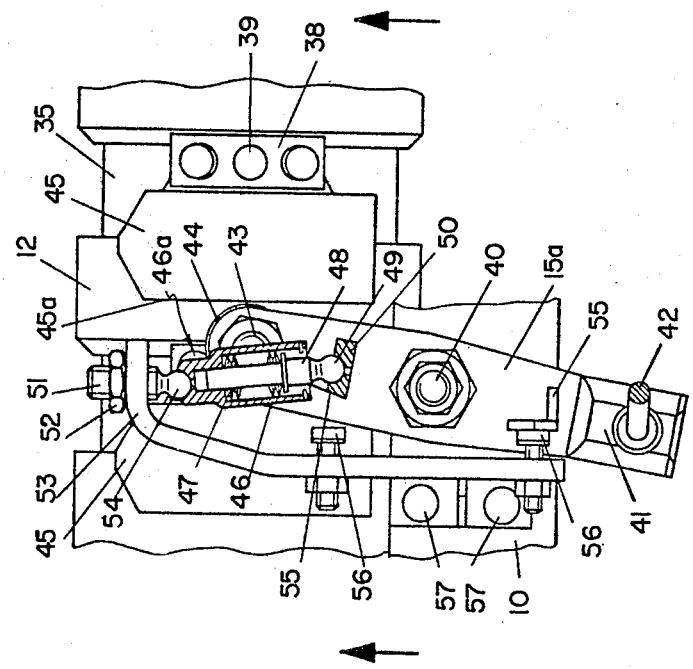
FIG. 8 is a partial view, similar to FIG. 5, showing a portion of the conversion cylinder and the associated control lever for operating the conversion valves.

Control cylinder 11 and conversion cylinder 12 are equipped with cams 36, 37 and 45. FIG. 4 shows how the cams 36 and 37 are secured to the cylinders. Cylinders 11 and 12 are provided with grooves 35 into which cams 36, 37, 45 (FIGS. 8 and 9) are inserted. Upon tightening the respective screws, shims 38 and screws 39 press the cams into grooves 35 and thus prevent cams 36, 37, 45 from falling out or being displaced. At the same time, however, this manner of securing makes it possible to displace the cams along the circumference of the cylinder into any desired position. For reasons of mounting, and in order to be able to adjust the endpoints of the cams on the circumference of the cylinder exactly, the cams are split.

The cams actuate control levers 15, 15a (See FIGS. 2, 3, 5 and 8) Control levers 15, 15a are pivotally mounted on base frame 10, by means of a bolt 40, intermediate their ends. The lower ends of levers 15, 15a are provided with longitudinal slots or bores into which sliding blocks 41 are inserted. Sliding blocks 41 have crossbores into which valve levers 42 of control valves 14, 14a are engaged. The reason for this design is that valve levers 42 of control valves 14, 14a move in a plane which is perpendicular to the plane of motion of control levers 15, 15a.

Figure 5:
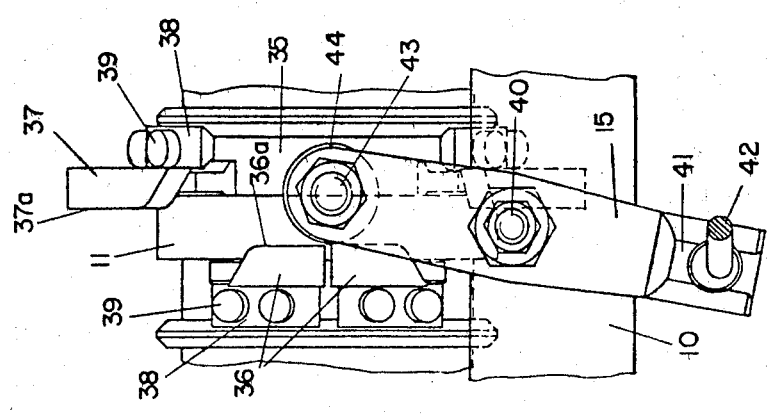
FIG. 5 is an enlarged partial elevational view showing a portion of a control cylinder and a portion of the valve operating control lever for operating the switching operation.

The upper end of control levers 15, 15a is equipped with bolts 43 and rotary rollers 44. Rollers 44 run on the lateral surfaces 36a, 37a, 45a of the cams. The actuation of a control lever 15 of control cylinder 11 by cams 36, 37 secured to the circumference of the cylinder is illustrated in FIGS. 5, 6 and 7:

(a) As shown in FIG. 5, control lever 15 is swung out to the righthand side, about its pivot 40, and its roller 44 applies against cam 36. The cam is split midway of its ends and each end is beveled.

Figure 6:
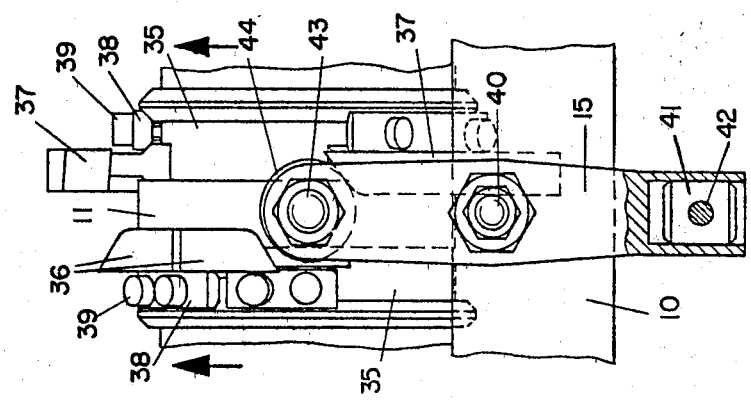

(b) The control cylinder rotates in the direction indicated by arrows in FIG. 6. This moves cam 36 upwardly and the next cam 37 comes into engagement. Roller 44 of control lever 15 comes into contact with the inclined surface of cam 37 and is thereby pushed to the lefthand side.

Figure 7:
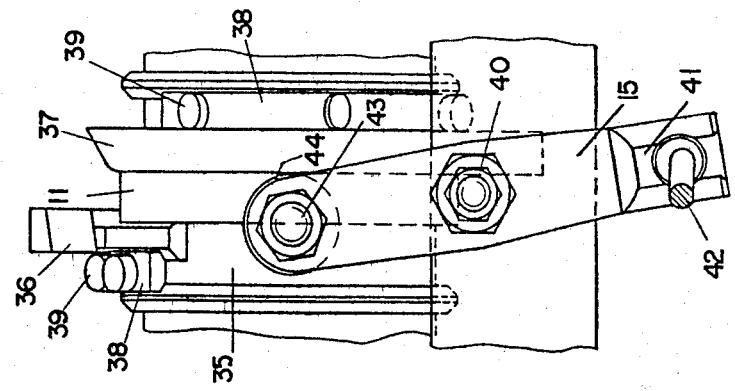
FIGS. 6 and 7 are views, similar to FIG. 5, showing advanced stages of operation of the lever.

(c) In FIG. 7, control lever 15 is in its extreme lefthand end position in which it runs on cam 37.

The two end positions of the control levers are predetermined by the respective cam and the stop in the associated control valve 14. This is the case only at control cylinder 11, however, since this cylinder is equipped with cams along its entire circumference, while conversion cylinder 12 is equipped with only short cam pieces 45 (see FIG. 8). For this reason, control levers 15a of conversion cylinder 12 are provided with special holding mechanisms, generally designated 46a. These mechanisms retain control lever 15a and, thereby, also valve lever 42, firmly in their swung-out end positions.

Each of the mentioned mechanisms 46a (see FIG. 8), comprises a sleeve 46, a bank of cup springs 47, and a bolt 48 having a spherical end 49 which end is seated in a ball socket 50 of control lever 15a. The bank of cup springs 47 is biased by means of a set screw 51 and check nut 52. Set screw 51, which is inserted in a bracket 53, has a spherical head 54 which is movably seated in sleeve 46. The spring force acting eccentrically of the point of rotation holds control lever 15a firmly in its end position. For pivoting the control lever into its other end position, it is necessary to first overcome the torque produced by the eccentrically acting spring force, up to the mid-position of control lever 15a. Control lever 15a is then pivoted into this other end position by the spring force.

The two end positions of the control levers are predetermined by stops 55 provided on control levers 15a and by adjustable buffers 56. The buffers 56 are inserted in brackets 53. Brackets 53 are secured to base frame 10 by screws 57.

Figure 3:
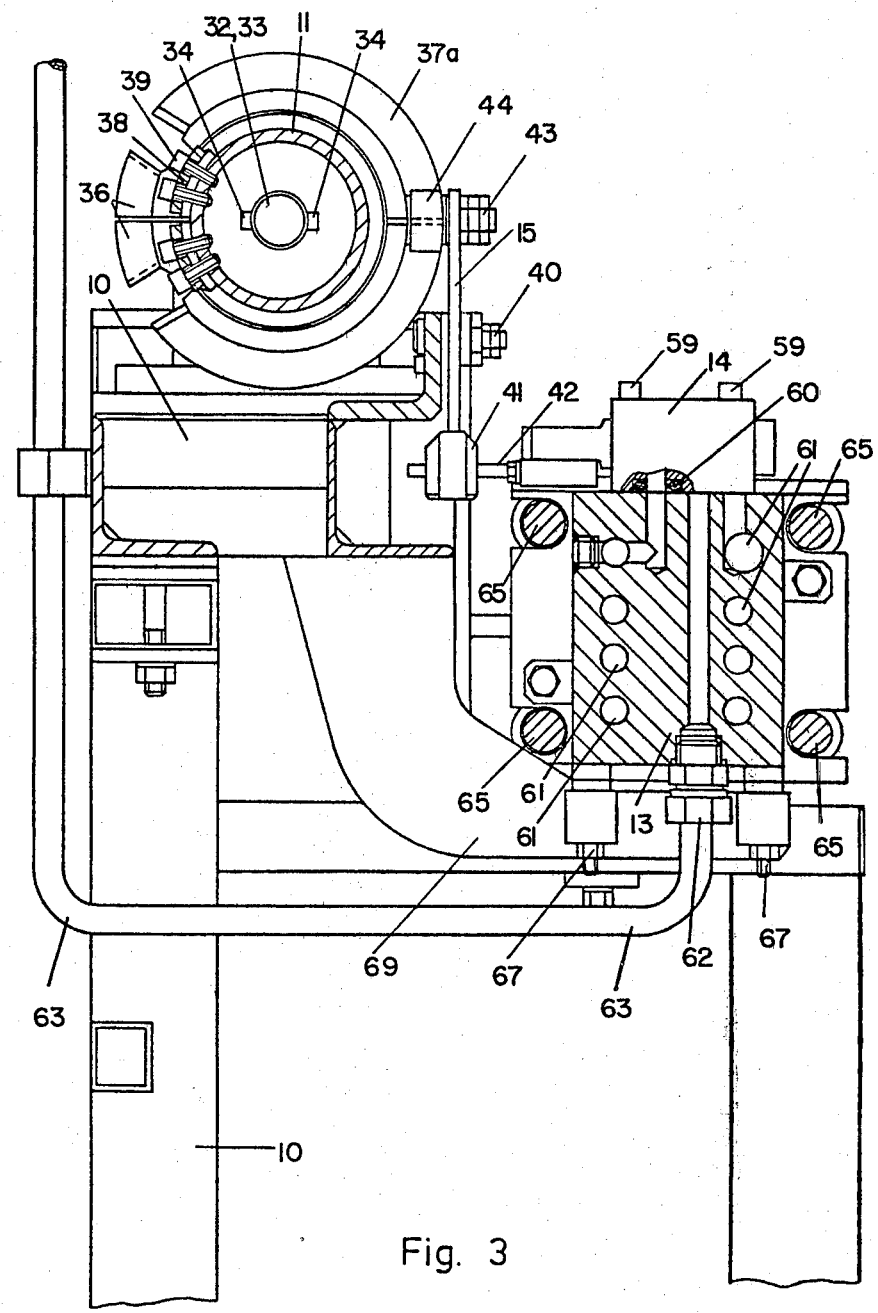
FIG. 3 is a partial sectional view taken along the line 3—3 of FIG. 1.

Control levers 15 and 15a actuate control valves 14 and 14a through valve levers 42. All of the control valves 14 and 14a are secured to valve blocks 13a, 13b and 13c by means of screws 59 (FIGS. 1, 2 and 3). All of the control valves 14, 14a are conventional valves for base plate mounting (i.e., the valves are screwed to a flat plate to which the pipe conduits for the hydraulic equipment are connected) and the base plates are designed, in accordance with the invention, as valve blocks 13a, 13b and 13c. On their upper side, valve blocks 13a, 13b, 13c exhibit the same pattern of holes as the control valves. O-rings 60 (FIG. 3) provides a sealing between the communicating bores of control valves 14, 14a and of the valve blocks. In this way, the exchange of defective valves is substantially facilitated since no pipes are to be screwed on or off.

Valves blocks 13a, 13b, 13c are provided with a plurality of longitudinal and cross-bores 61 in their interior, see FIG. 3. These bores convey pressurized fluid to or from the individual control valves 14, 14a, depending on the switching position of the valves, and also connect the individual valves to one another. The underside of the valve block is provided with tapholes to which, the individual pipes 63 leading to the hydraulic equipment are connected by means of screwed joints 62.

For reasons of ease in the drilling operation, valve blocks 13a, 13b and 13c are assembled of three individual blocks and two head plates 64a and 64b, and are held in an assembled state by four tie rods 65 (FIGS. 1 and 2). Each individual longitudinal bore 61 is sealed by O- rings in the parting planes. Pressure and return connections 66, 66a are provided in head plates 64a, 64b.

Valve blocks 13a, 13b and 13c are supported on set screws 67 permitting an accurate vertical adjustment. For adjustment in the horizontal plane, screws 68 are provided on each end of the assembled valve blocks. Screws 68 are inserted in brackets 69 which are welded to base frame 10.

Base frame 10 is a steel structure supported on the floor by means of four legs 70. In the lower part of the base frame, drip pans 71 are provided in which operating fluid is collected in case fo failures.

While a specific embodiment of the invention has been shown and described in detail to illustrate the application of the principles of the invention, it will be understood that the invention may be embodied otherwise without departing from such principles.

What is claimed is:

1. A switching lever mechanism for operating a switching lever between two end positions, comprising first and second laterally spaced apart cams, a follower lever pivotally mounted between its ends and including one end with a roller follower disposed between said cams, and an opposite end connectable to a member for shifting the member, a socket formed on said follower lever between the roller follower and the pivotal mounting thereof, a bolt having a spherical head pivotally mounted in said socket, a bracket mounted in a stationary position alongside said follower lever and having a set screw with a head portion, a sleeve pivotally mounted on said head portion and carrying said bolt, and spring means in said sleeve biasing said bolt outwardly, said sleeve being pivoted centrally between said cams so that when said follower lever is engaged in one end position, it will be biased by said spring into that end position, and when it moves beyond dead center or the pivotal location of the mounting of said sleeve, it will switch over and bias the lever into an opposite end position against the other of the cams.

* * * * *